March 31, 1925.
T. A. WRY
ENAMELING APPARATUS
Filed April 18, 1923
1,532,017
2 Sheets-Sheet 1
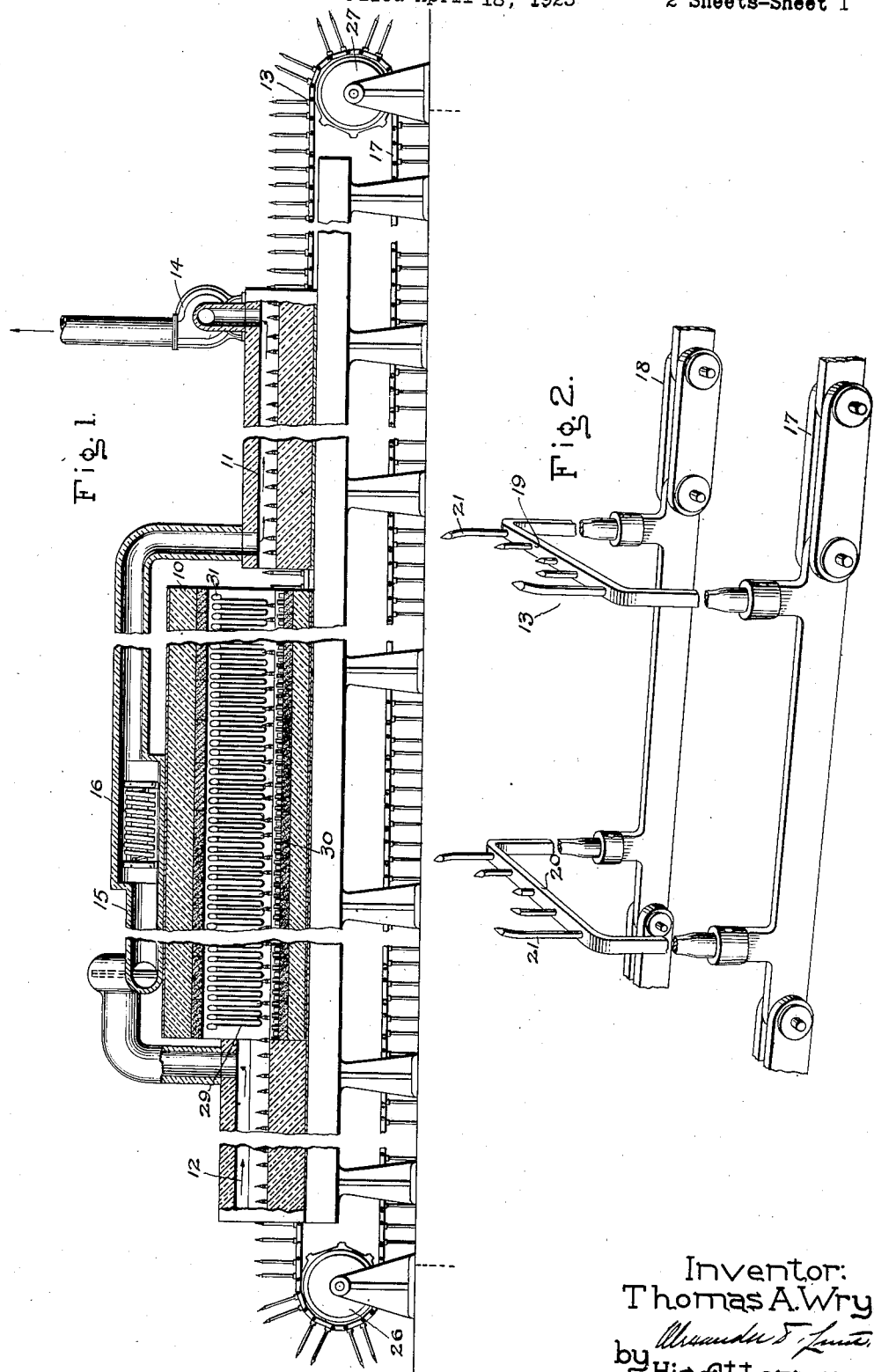
Inventor:
Thomas A. Wry,
by His Attorney.

March 31, 1925.

T. A. WRY 1,532,017

ENAMELING APPARATUS

Filed April 18, 1923   2 Sheets-Sheet 2

Inventor:
Thomas A. Wry,
by His Attorney.

Patented Mar. 31, 1925.

1,532,017

UNITED STATES PATENT OFFICE.

THOMAS A. WRY, OF LYNN, MASSACHUSETTS, ASSIGNOR TO GENERAL ELECTRIC COMPANY, A CORPORATION OF NEW YORK.

ENAMELING APPARATUS.

Application filed April 18, 1923. Serial No. 633,004.

*To all whom it may concern:*

Be it known that I, THOMAS A. WRY, a citizen of the United States, residing at Lynn, in the county of Essex, State of Massachusetts, have invented certain new and useful Improvements in Enameling Apparatus, of which the following is a specification.

My invention relates to enameling apparatus and has for its object the provision of simple, reliable and efficient means whereby the enamel may be dried and baked in a continuous operation.

More particularly my invention relates to apparatus for applying vitreous enamels to metallic articles, such as for example, in the manufacture of reflectors. The usual operation of applying this vitreous enamel consists in dipping the articles in the prepared liquid enamel; drying them and then placing them in a baking oven where they are heated to a very high temperature. This process necessitates the handling of the articles several times, and also requires skilled operators to properly bake the enamel since for the best results the enamel must be baked to a definite point. If the enamel is baked too long or if it is not baked long enough very poor results are obtained.

In carrying out my invention I provide means whereby the articles after being dipped in the enamel may be placed on a conveyor after which the drying and proper baking of the enamel takes place automatically as a continuous operation.

Figure 3:
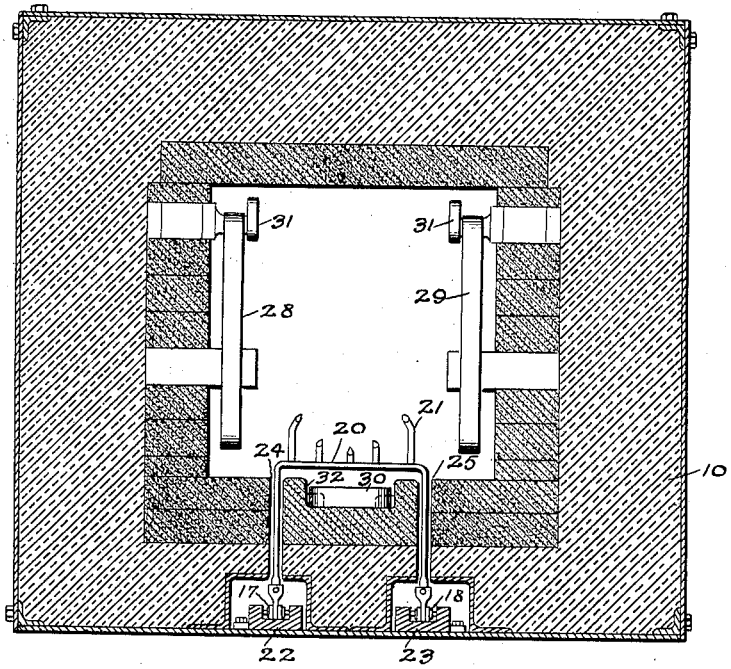
Figure 4:
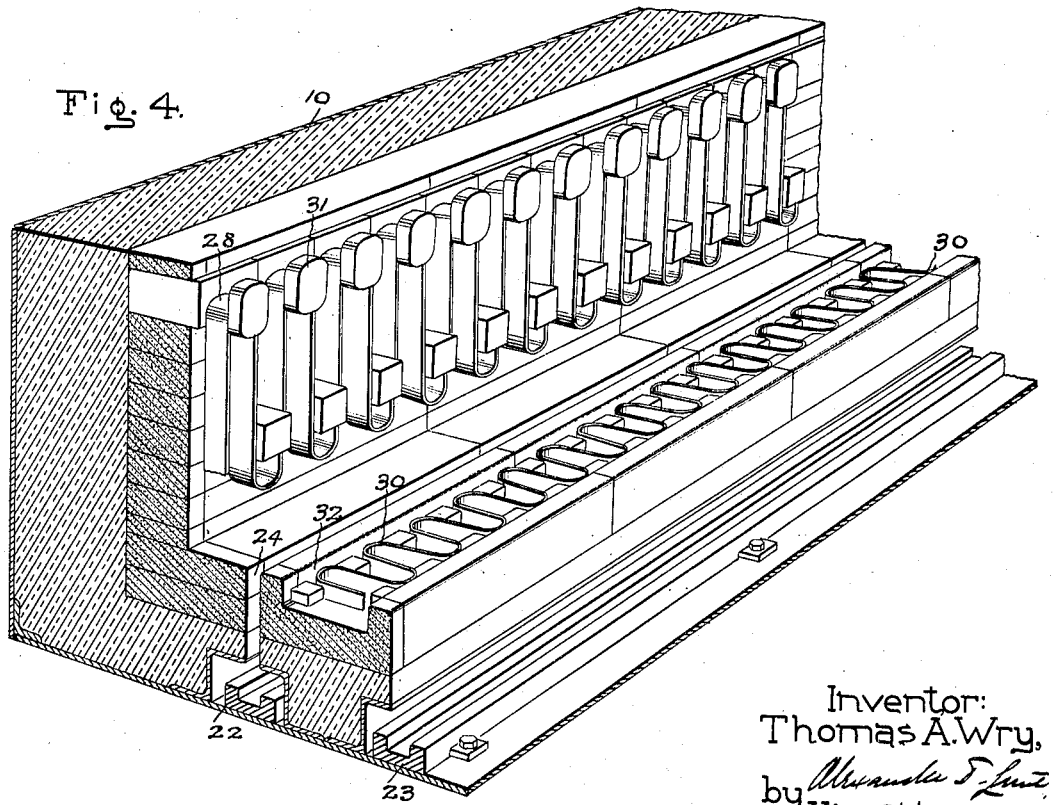

For a more complete understanding of my invention reference should be had to the accompanying drawing in which Fig. 1 is a section view of enameling apparatus embodying my invention; Fig. 2 a fragmentary perspective view of the conveyor; Fig. 3 is a section view through the baking oven; while Fig. 4 is a perspective view partially in section showing the arrangement of the heating elements in the baking oven.

Referring to Fig. 1 of the drawing, the enameling apparatus in one form of my invention comprises a high temperature baking oven 10 placed in a horizontal position, with a drying oven compartment 11 located adjacent one end and a cooling compartment 12 located adjacent the other end. The articles to be enameled after being dipped in the enamel are carried by an endless conveyor 13 first through the drying compartment 11 where the enamel is thoroughly dried, then through the high temperature baking oven 10 where the enamel is baked and lastly through the cooling compartment 12. For the purpose of facilitating the drying of the articles in the compartment 11 heated air received from the cooling compartment 12 is circulated through the drying compartment. This is effected by means of a suitable fan or blower 14 which draws air as indicated by the arrows into the cooling compartment at its outer or left hand end over the heated articles passing through the compartment whereby the air is heated, through a pipe 15 to the left hand end of the drying compartment 11 and then through the drying compartment. A suitable electric heating resistance 16 is located in the pipe 15 whereby if desired the temperature of the air received from the cooling compartment may be increased to effect the more rapid drying of the articles in the compartment 11.

Referring to Fig. 2, the conveyor 13 comprises two parallel endless chains 17 and 18 which support upwardly extending U-shaped members 19, the horizontal transverse portions 20 of which pass through the interior of the baking oven 10 and form the support for the articles. For convenience in supporting the articles pegs or pins 21 are provided on the portions 20. The U-shaped members 19 are made of a suitable heat resisting material adapted to withstand the extremely high temperatures in the oven, such as an alloy of nickel and chromium. The chains 17 and 18 do not pass through the interior of the oven, but, as shown in Fig. 3, travel in suitable guides 22 and 23 located exterior of and below the oven. In the bottom wall of the oven are two parallel longitudinally extending slots 24 and 25 in which the upwardly extending portions of the members 19 are free to move in their journey through the oven. In this manner the chains 17 and 18 are protected from the high temperatures in the oven, the U-shaped members 19 made of heat resisting material being the only parts of the conveyor which are subjected to these high temperatures. The conveyor is driven through pairs of sprocket wheels 26 and 27 cooperating with chains 17 and 18 and located at opposite ends of the apparatus, by means of suitable driving means such as an electric motor (not shown).

Any suitable means for heating the oven 10 may be used although I have shown electric resistance heating elements 28, 29, and 30. These resistance elements are made up from a ribbon of resistance material which is bent back and forth in a zigzag form. The resistance elements 28 and 29 at the sides respectively are supported by hanging their loops over heat refractory supports 31 projecting from the side walls of the oven. They extend throughout the length of the oven. The resistance element 30 is mounted in a suitable longitudinal recess 32 in the bottom wall of the oven underneath the transverse conveyor sections 20. The articles on the conveyor are thus subjected to the application of heat from both above and below whereby they are more quickly brought up to the desired temperature.

In the operation of my invention, the oven 10 is first brought up to the proper temperature after which the conveyor 13 is started. To provide the necessary heated air for the drying compartment 11 the heater 16 may be used at the beginning of the operation until such time as the air is sufficiently heated by contact with hot enameled articles passing through the compartment 12, the air being circulated by means of blower 14. If necessary, the heater 16 may be used throughout the enameling operation to heat the air received from the cooling compartment to the desired temperature. The metallic articles to be enameled are dipped in the prepared liquid enamel and then placed on the supporting pins 21 at the right hand end of the apparatus (Fig. 1), the articles then starting on their journey through the apparatus as previously described. Upon emerging from the cooling compartment 12 the articles are covered with a coating of vitreous enamel. It will be observed that by means of my apparatus the enameling process is carried out automatically after the articles have been dipped and placed on the conveyor, no further attention being necessary. The drying and baking of the enamel on each article is thus uniform so that uniform results and the best possible results are obtained.

While I have described my invention as embodied in concrete form and as operating in a specific manner in accordance with the provisions of the Patent Statutes, it should be understood that I do not limit my invention thereto, since various modifications thereof will suggest themselves to those skilled in the art without departing from the spirit of my invention, the scope of which is set forth in the annexed claims.

What I claim as new and desire to secure by Letters Patent of the United States, is:—

1. Enameling apparatus comprising a high temperature oven having a wall provided with a plurality of longitudinally extending apertures, conveyor members in said oven extending between said apertures, means exterior of said oven for moving said conveyor members through said oven, and connections through said apertures between said conveyor members and said means.

2. Enameling apparatus comprising a high temperature oven having a wall provided with a plurality of longitudinally extending apertures, a pair of endless chains exterior of said oven, conveyor members extending through said oven between said aperture, and connections through said apertures between said conveyor members and said chains whereby said conveyor members are movable by said chains through said oven.

3. Enameling apparatus comprising a high temperature oven having a wall provided with a plurality of longitudinally extending apertures, conveyor members extending through said oven between said apertures provided with supporting means projecting from said apertures, heating means for the oven underneath said conveyor members, and means exterior of said oven for moving said conveyor members through said oven.

4. Enameling apparatus comprising a high temperature oven having a wall provided with a pair of longitudinally extending apertures, a pair of endless chains exterior of said oven, conveyor members carried by said chains each comprising upright portions extending through said apertures into the interior of said oven and a transverse portion carried by said upright portions extending through said oven between said apertures, movable continuously through said oven by said chains, and heating means for said oven underneath the transverse portions of said conveyor members.

In witness whereof, I have hereunto set my hand this 14th day of April, 1923.

THOMAS A. WRY.